June 13, 1967  C. E. ANDERSON  3,324,875
VALVE

Filed May 5, 1964  2 Sheets-Sheet 1

INVENTOR.
CLIFFORD E. ANDERSON
BY
AGENT

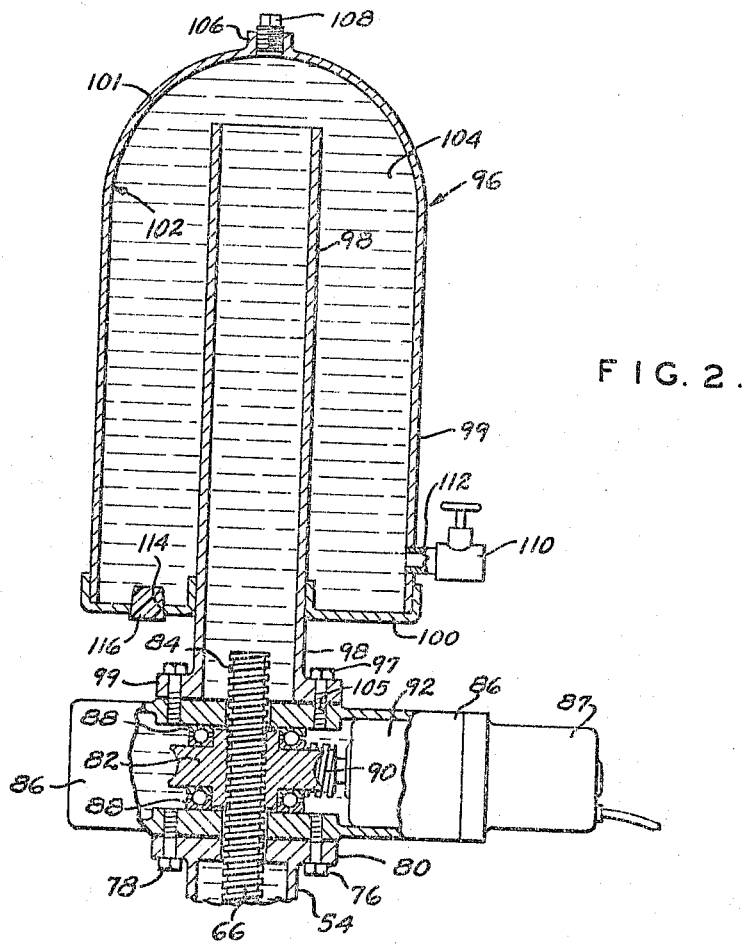
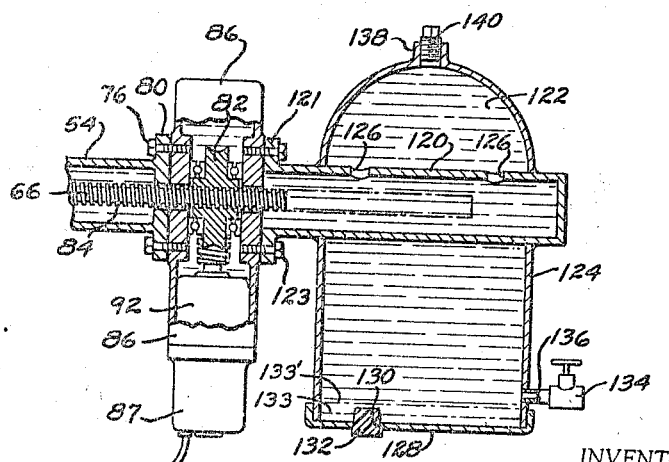

United States Patent Office  3,324,875
Patented June 13, 1967

3,324,875
VALVE
Clifford E. Anderson, Houston, Tex., assignor to ACF Industries, Incorporated, New York, N.Y., a corporation of New Jersey
Filed May 5, 1964, Ser. No. 364,959
7 Claims. (Cl. 137—236)

This invention relates generally to valves and more specifically to valves and remote operating systems therefor which are adapted to be submerged in fluids such as sea water, for example.

The petroleum industry in its continuous exploration and research programs has recently discovered and developed a number of offshore petroleum reserves of major importance and it is expected that such activity will be greatly increased. Heretofore completion of offshore oil wells, which includes the installation of a wellhead assembly which supports the string or strings of tubing in the well and connecting the wellhead assembly to production equipment, has been accomplished on a platform positioned above the surface of the ocean. Recent developments in completion techniques have resulted in underwater oil well completion, where the wellhead assembly is positioned on or adjacent the ocean floor. Since each wellhead assembly contains a number of valves, underwater completion of oil wells presents a number of problems to the valve industry. Valves must be provided which will withstand the corrosive effects of sea water and which can be operated remotely through the use of power operators to selectively open or close the valve. Since submerged valves may be positioned under several hundred feet of water and may be subjected to severe hydrostatic pressures developed by the water, valves and valve control systems must be provided which will withstand the destructive effects of hydrostatic pressures and which will control the corrosive action of sea water.

Due to the development of modern super tanker vessels to transport crude oil for the petroleum industry, a number of offshore loading facilities have been developed about the world to facilitate loading and unloading of these vessels. Modern super tanker vessels may have a draft approaching 75 feet which prevents their use in many ports throughout the world. Occasionally these super tanker vessels are partially loaded in a port facility and then are moved into water of sufficient depth where the loading operation is finished by transferring fluid from a smaller tanker vessel to the large vessel. Generally offshore loading facilities are preferable to control the loading and unloading of these vessels.

A number of offshore loading facilities have been developed which utilize submerged pipelines and which have submerged remotely controlled valves at the end of the pipeline for controlling the flow of fluid through the systems. Large flexible hoses, which are connected to the end of the pipelines or to the discharge side of the submerged valves, lie on the ocean floor when not in use, and have marking buoys attached to the free end thereof by a small cable or line. The vessel to be loaded or unloaded, after anchoring near the marking buoy, retrieves the marking buoy and hoists in the line or cable which in turn raises the flexible hose from the ocean floor. After the hose has been cleaned by washing off any mud accumulation or marine growth, etc., connection is made to the vessel. A control station located on shore and which might be up to two miles from the valve to be controlled, is provided with power control apparatus for operating a fluid motor, generally called a piston operator, which is mounted on the valve and which moves the gate or valve element of the valve to an open or closed position as desired. After receiving some signal, as a radio signal, visual signal, or audible signal, from the vessel that the connection has been made, the control station starts its fluid pumping equipment and remotely controls opening and closing of the offshore submerged valves as desired. Such remotely controlled operating devices for valve control may be operated by hydraulic, gas, or electric systems. Any of many well-known suitable types of valve operators might be employed without departing from the spirit or scope of this invention.

The disadvantage of most remotely controlled valve operator systems is their inability to indefinitely withstand the destructive effects of severe hydrostatic pressure on the ocean floor. One development involves the encasement of the entire valve and operator system in a casing constructed sufficiently strong to stand the hydrostatic pressure to which the valve system is to be subjected. However, even under relatively shallow water depths, such as 50 to 100 feet for example, a very large casing for encasing a large valve and operator system must be fabricated of extremely heavy metal, thereby making the system quite expensive. Such a casing must also be constructed sufficiently strong to withstand external fluctuating pressures such as are caused by changing tide levels in the ocean and internal casing pressure fluctuations which are caused by movement of the valve stem of the valve. As the valve stem is moved in a direction outwardly of the valve it displaces a portion of the air in the container thereby causing a considerable pressure increase within the container. Another difficulty inherent in valve systems which are enclosed in casings, is that leakage from the valve through the stem packing cannot be permitted. Fluid leaked from the valve will fill the casing and cause excessive internal casing pressure which will rupture the casing and allow sea water to damage the valve and operator system. Leakage of fluid from the valve will fill the casing and cause damage to the operator assembly even if rupture of the casing does not occur. Another serious disadvantage in the use of an encased operator system is that a pressure increase in the casing which might be caused by leakage of fluid from the valve, may cause pressure locking of the valve. The valve cannot be opened or closed in a pressure locked condition. Pressure locking occurs when the casing becomes filled with an incompressible fluid. The incompressible fluid within the casing will prevent movement of the stem into the casing and, therefore, will prevent operation of the valve. Unless the casing is constructed extremely strong the severe internal casing pressures, developed by the power operator as it attempts to force the valve stem into the filled casing, will cause the casing to rupture. Casing enclosed valves and remote operator systems are also impractical from a servicing consideration. The valve and operator system for a submerged valve are completely enclosed by the casing, thereby even the simplest of servicing, such as adjustment of the valve packing to stop packing leakage, is rendered impossible.

Another development has been the provision of a casing about the entire valve and operator system, such as described above, and to fill the casing with transformer oil. The casing is then connected to an accumulator which is precharged with nitrogen to a pressure in excess of the final hydrostatic pressure to which the valve is to be subjected. When the encased pressurized valve and operator system is positioned on the ocean floor the internal pressure of the casing will be slightly above the hydrostatic pressure. The valve stem in moving outwardly of the valve will merely displace the oil in the casing which will in turn further compress the nitrogen gas in the accumulator. Pressure within the casing will fluctuate as the valve stem is reciprocated but it will be at a level slightly above hydrostatic pressure at all times. Since the internal and external pressures of the casing will differ only slightly when the valve and operator system is submerged, the casing may be constructed from light material, thereby reducing the cost and bulk of the system as compared to the unpressurized casing system. A system of this type is also subject to criticism because minor servicing, such as stem packing adjustment, which may be accomplished by a diver, is rendered impossible because the valve and operator system is surrounded by the casing. An enclosed system of this type is also subject to damage by leakage of the valve which will increase the internal pressure of the casing to a high enough level to cause the casing to rupture. This system also may be subject to failure induced by pressure variations caused by rising and falling of the tide and by movement of the valve stem within the casing as discussed above. Another criticism is that leakage of the pressurizing system of the casing will result in a loss of pressure within the casing allowing hydrostatic pressure to collapse or rupture the casing. If the casing develops a minor leakage, sea water will enter the system and will cause corrosion or other damage to the operator and the valve necessitating the replacement thereof.

While exterior corrosion of the valve and its operator systems can be effectively prevented by employing special protective coatings and/or employing corrosion resistant materials, the interior working parts of the operator systems cannot be so protected.

Accordingly, it is a primary object of this invention to provide a novel pressure balancing system for the power operator of a valve which causes the pressure within the power operator to be balanced with hydrostatic pressure at all times.

It is a further object of this invention to provide a novel pressure control system for a valve operator, which will permit leakage of lading from the valve into the pressure system without causing damage to either the valve or the system.

It is a further object of this invention to provide a novel pressure control system for a remotely controlled valve wherein minor servicing, such as adjustment of the stem packing to stop packing leakage may be accomplished underwater.

It is another object of this invention to provide a novel environmental pressure control system for a submergible valve and valve operator system which maintains the internal and external pressures of the valve operator system in a balanced condition at all times.

An even further object of this invention contemplates the utilization of the hydrostatic pressure of the medium surrounding the valve and valve operator for pressurizing the internal portion of the operator.

It is an even further object of this invention to provide a novel pressure control system for a submergible valve and valve operator system, which is inexpensive in manufacture and reliable in operation.

Other and further objects of this invention will be obvious upon an understanding of the illustrative embodiments about to be described, or will be indicated in the appended claims, and various advantages not referred to herein will occur to one skilled in the art upon employment of the invention in practice.

Preferred embodiments of the invention have been chosen for the purpose of illustration and description and are shown in the accompanying drawings forming a part of the specification, wherein:

FIGURE 2 is a partial elevational view showing the pressure balancing system of FIGURE 1 in greater detail and illustrating variation of the fluid seal level within the pressure equalizing chamber.

FIGURE 3 is a partial elevational view in section illustrating a modified embodiment of the valve pressure control system for use with a horizontal stem valve.

Figure 1:
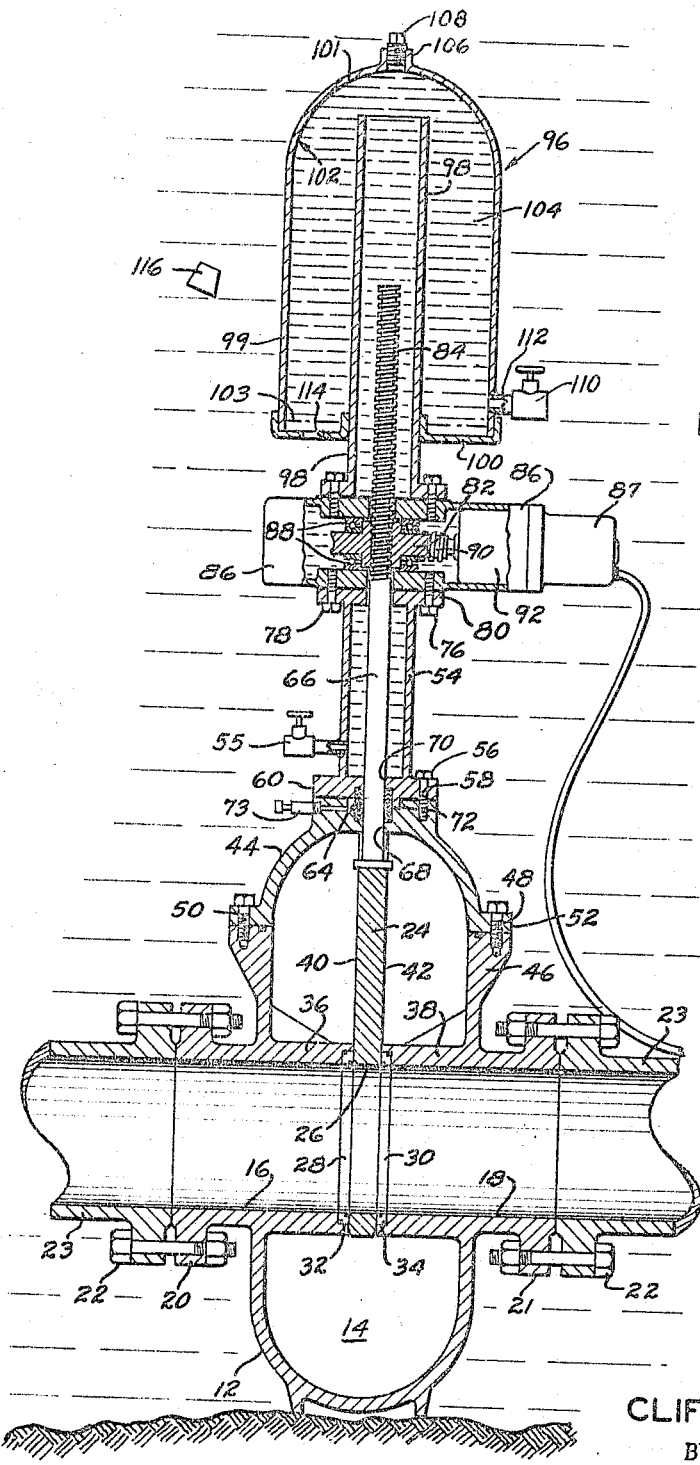
FIGURE 1 is an elevational view in section illustrating a gate valve in accordance with the present invention.

Briefly, the invention consists of a remotely controlled valve stem drive system for a rising stem type valve and which includes structure to maintain the internal pressure within the drive system in a balanced condition with the hydrostatic pressure of the medium surrounding the drive system. Structure is provided which will communicate hydrostatic pressure of sea water to the interior of the pressure controlled unit and yet maintain the interior of the pressure controlled unit against the corrosive effects of the sea water.

Referring now to the drawings for a better understanding of the invention, a valve 10 is illustrated in FIGURE 1 which comprises a valve body 12 formed with a valve chamber 14 and having flow passages 16 and 18 in communication with the valve chamber 14. Flanges 20 and 21 are formed integral with the valve body and receive bolts 2 for bolting the valve into a flanged pipeline 23. The valve may be connected to a pipe system by any other well-known connection structure such as welded or threaded connection for example, without departing from the spirit or scope of this invention.

A gate member 24 having a port 26 formed therein is positioned within the valve chamber 14 and is movable between an open position where the port 26 is aligned with the flow passages 16 and 18 to permit the flow of fluid through the valve and a closed position blocking the flow of fluid through the valve. A pair of identical seat assemblies 28 and 30 are positioned in opposed seat recesses 32 and 34 formed respectively in annular bosses 36 and 38 which extend into the valve chamber 14. The gate 24 is provided with parallel planar working surfaces 40 and 42 which are engaged by the seat assemblies 28 and 30 respectively to establish a fluid-tight seal between the gate and the valve body. A bonnet assembly 44 is removably fixed to an annular flange portion 46 of the valve body 12 by a series of threaded studs 48 which extend through a series of openings 50 formed in an annular bonnet flange 52 to form a sealed closure for the valve chamber 14. A yoke tube assembly 54, having a filling fitting 55 threaded or welded thereinto, is fixed to the bonnet 44 by a series of threaded studs 56 which extend through openings 58 formed in an annular flange 60 of the yoke tube 54 and are threaded into an annular series of threaded openings 62 in the bonnet 44. A packing chamber 64 is formed by enlarged concentric bores formed in the bonnet and in the yoke tube 54.

A valve stem 66 is fixed to the gate 24 and extends through openings 68 and 70 formed respectively in the bonnet and yoke tube and through the packing chamber 64. A packing assembly 72 is positioned within the packing chamber 64 and surrounds the valve stem 66 to provide an effective seal between the bonnet and the valve stem. A power operator 74 including a drive unit 86 powered by a motor 87 is fixed to the upper portion of the yoke tube 54 by a series of bolts 76 which extend through a series of openings 78 formed in an annular flange 80 of the yoke tube. The motor 87 may be one of various well-known types, for example electrically energized or fluid energized, without departing from the spirit and scope of this invention. The motor 87 will generally be controlled remotely from a distant power source. An internally threaded drive gear 82 which mates with exterior threads 84 formed on the valve stem 66 is supported for rotation within the drive unit 86 by upper and lower thrust bearings 88. A worm gear 90 is actuated through a series of reduction gears 92 by the motor 87 to impart rotation to the drive gear 82. The motor 87 upon being energized will, through its gear reduction system, impart rotary motion to the drive gear 82 which causes the interengaging threads between the drive gear and the valve stem to impart axial movement to the valve stem and thereby induce opening or closing movement to the gate 24. The specific stem drive unit described above is intended to be merely illustrative and any of the numerous well-known suitable stem drive systems which are commercially available might be utilized in accordance with this invention without departing from the spirit or the scope thereof.

In accordance with a feature of this invention, a pressure balancing unit 96 having a flanged support tube 98 extending therefrom is fixed to the drive unit 96 by a series of bolts 97 which extend through the support tube flange 99 and are threaded into a series of threaded openings 105 formed in the drive unit. The specific support structure described and illustrated in regard to FIGURES 1 and 2 are not intended as limiting this invention. The pressure balancing unit may be supported by any desired structure without departing from the spirit or the scope of this invention. It is merely necessary that there be a fluid-tight sealed connection between the valve structure and the pressure balancing unit 96. A base plate 100 forming the bottom wall of the pressure balancing unit 96 is fixed to the outer circumference of the tube 98 such as by welding, for example. A housing 102, which may have generally cylindrical walls 99 and which has a closed end 101, is fixed about the outer circumference of the base plate 100 by welding or the like to define a pressure balancing and volume controlling chamber 104. An internally threaded drain fitting 106 is fixed to the closed end 101 of the housing 102 and threadedly receives a drain plug 108 for closing the same. A filling valve 110 is connected to a valve fitting 112 which extends from the cylindrical wall 99 of the housing 102 adjacent the lower end thereof. The support tube 98, to which the base plate 100 is fixed, surrounds the valve stem 66 and extends into the chamber 104 to a position adjacent the closed end of the housing 102. The base plate 100 of the pressure balancing unit is formed with at least a single aperture 114. One or more plug members 116 (FIG. 2), which may be formed of plastic, are press-fitted within the openings 114 when the valve assembly is installed, but are adapted to be blown from the openings 114 upon the first actuation of the valve stem, as will be discussed hereinbelow.

Installation procedures for a submerged pipeline system generally require that the valve and pipeline components be preassembled on an installation vessel and then lowered to the ocean floor. In the installation of a valve employing a power operator and a pressure balancing system in accordance with this invention, the valve is preassembled into the pipeline as discussed above and the power operator and pressure balancing and volume controlling system is preassembled to the valve. The valve stem during the installation procedure will be in its unextended position. After the plastic plugs 116 have been press-fitted into the openings 114 and the drain plug 108 removed from its fitting 106, the yoke tube 54, drive unit 86 and equalizing chamber 96 are filled with an incompressible protective fluid such as transformer oil through the filling valve 110. Since the valve stem 66 is positioned in its unextended position during the filling operation a minimum amount of the volume of the chamber 104 and units 54 and 86 with transformer oil and filling structure is removed from the filling valve 110 and the valve and operator assembly are ready for submersion. After the valve and operator assembly are positioned on the ocean floor the system is ready for operation. As the valve stem is driven outwardly of the valve during its first actuation, it is forced into the chamber 104. Because the chamber is filled with an incompressible fluid, moving the stem into the filled chamber will rapidly build up pressure within the chamber. When the internal pressure of the chamber reaches a level substantially above the hydrostatic pressure of the sea water at the valve level, the plug 114 will be blown from the opening 116 allowing some of the oil to flow out through the opening and dissipating the excessive chamber pressure. As the stem continues to be moved toward its maximum extended position a volume of oil equal to the volume of the stem will be forced out the aperture 114 and will be lost. The oil which is forced into the sea will rise to the surface of the sea thereby indicating a successful first actuation of the system. Assuming that the valve has been submerged in water after the displaced volume of transformer oil has been vented through the opening 114 the pressure within the chamber will quickly drop to a pressure equal to the hydrostatic pressure of the sea water at the valve level. As the stem is moved inwardly toward the valve, the volume of protective fluid which the stem displaces will be reduced and the water surrounding the system will enter the lower portion of the chamber 104 and will replace the reduced volume of oil thereby maintaining the pressure within the chamber 104 at the same level as the level of hydrostatic pressure of the sea water.

Oil is utilized within the pressure balancing system not only because of its preserving quality but also because it is a fluid of lower specific gravity than water and also will not mix with water. The oil will float on top of the water within the pressure balancing chamber 104 and will establish a liquid seal 103 (FIG. 1) within the pressure equalizing chamber 104. Since the tube 98 extends to the uppermost portion of the chamber 104, the water level or "liquid seal" level will remain below the upper end of the tube 98 at all times and the water will not be permitted to enter the drive unit or the yoke tube. Upon movement of the valve stem 66 to its lowermost position, as illustrated in FIGURE 2, the volume of oil which it displaces will be reduced and the liquid seal in the chamber 104 will rise to a maximum level 103'.

Movement of the stem 66 into the unit 96 during the first several actuations will force a small amount of oil out of the chamber 104 along with the sea water and a minimum liquid seal level 103 shown in broken lines in FIGURE 1 will exist. The tube 98, however, will extend well above the maximum level 103' of the fluid seal and will prevent water from entering the drive unit or the yoke tube. As the hydrostatic pressure of the sea water at the level of the valve changes due to rising and falling of the tide for example, the increased or decreased hydrostatic pressure is transmitted to the interior of the drive unit and yoke tube through the opening 114 in the pressure balancing unit 96. The pressure within the pressure balancing unit and the hydrostatic pressure therefore will always remain balanced and there will be no tendency for the system to be damaged by pressure differential. Also the seal level 103 will remain substantially constant due to the incompressibility of the oil.

If the valve packing assembly of the valve becomes worn to the extent that lading begins to leak from the valve chamber 14 past the valve packing assembly 72 into the yoke tube 54, the internal pressure within the drive unit 86 and pressure balancing chamber 104 would not be increased above hydrostatic pressure of the sea water as does occur in casing enclosed systems. The fluid leaking into the yoke tube 54 from the valve packing assembly 72 would merely displace the transformer oil within the system and would flow out of the opening 114 in the base plate 100 of the pressure balancing unit 96. When this occurs the transformer oil being of a lighter specific gravity than water, will appear on the surface of the body of water in which the valve is submerged to indicate that leakage has occurred. The leaked fluid, since it will generally be crude oil, is also of lower specific gravity than the specific gravity of sea water and will rise to the surface of the body of water in which the system is submerged to indicate the occurrence of leakage. A diver may then be sent down and using a simple wrench may adjust a packing fitting 73 to repressurize the packings and thus stop the leakage. The diver may then connect a filling conduit to the yoke tube connection fitting 55 and from a pressurized fluid supply may force additional transformer oil into the yoke tube and drive unit to displace or flush the leaked lading from the entire assembly. An outlet conduit may be connected to the drain fitting so that the flushed fluid could be transported to the surface of the ocean without contaminating the ocean or losing the fluid.

Pressure locking of an encased valve and operator assembly may occur if the casing becomes filled with a liquid. The stem will not be able to displace any liquid from the casing since the casing is sealed and therefore will be prevented from moving into the casing. If the casing does not burst from the build-up of pressure, the motor which drives the operator will stall, possibly destroying the motor or otherwise damaging the operator system. Pressure locking of a valve and valve operator system employing the invention cannot occur because the chamber 104 is always open to allow fluid, which is displaced by the stem as it is moved, to flow outwardly of the chamber 104. The pressure balancing member 96 may be lightly and inexpensively constructed without regard to the depth at which the system is to be located because the internal and external pressures will always remain balanced and there will be no occurrence of pressure differential which would damage the casing of the pressure balancing unit.

In accordance with another feature of the invention, as illustrated in FIGURE 3, a modified embodiment of the invention is provided for a valve system in which the stem of the valve is horizontally disposed. This modified embodiment comprises a pressure balancing unit 118 having a flanged horizontal support tube 120 which extends into the interior of the pressure balancing chamber 122. The horizontal tube 120 is fixed, such as by welding, for example, into the housing 124 of the pressure balancing unit 118 and has an annular flange 121 thereof fixed to the drive unit 86 by means of a series of bolts 123 to support the pressure balancing unit on the drive unit.

The support structure for the pressure balancing unit is not intended as limiting in regard to this invention. Various other means of supporting the pressure balancing unit may be employed within the spirit and scope of this invention. The horizontal tube 120 is positioned in coaxial relation with the valve stem 66 and is adapted to receive the outer extremity of the valve stem 66 as the stem moves to its extended position. The horizontally disposed tube 120 is formed with a plurality of openings 126 for establishing communication between the pressure balancing chamber 122 and the drive unit 86 and the yoke tube 54. A base plate 128 is welded or otherwise fixed to the lower extremity of the housing 124 and serves as a bottom wall closure for the pressure balancing unit 118. The base plate 128 is formed with openings 130 which receive plug members 132 to temporarily seal the pressure balancing chamber 122 as discussed hereinabove. A filling valve 134 is connected to a conduit fitting 136 extending from the housing wall 124 adjacent the base plate 128 and communicating the valve 134 with the pressure balancing chamber 122. An internally threaded drain fitting 138 is fixed to the closed end of the housing and threadedly receives an externally threaded drain plug 140 for closing the fitting 138.

Operation of the modified embodiment illustrated in FIGURE 3 is substantially the same as that shown in FIGURES 1 and 2. After the yoke tube, drive unit, and pressure balancing unit have been filled with transformer oil and the plugs 132 have been press-fitted within the openings 130 the assembled structure is lowered to the ocean floor. The valve stem 66 upon its first actuation is moved from its innermost position to its outermost position thereby displacing a substantial quantity of the transformer oil and increasing the pressure within the pressure balancing unit 118 to such an extent that the plastic plugs 132 are blown from their respective openings 130 thereby establishing communication between the pressure balancing unit and the medium (seawater) surrounding the valve. At the instant the plugs 132 are displaced from the openings 130 by the increased pressure within the pressure balancing chamber 122, the pressure within the chamber 122 will be above hydrostatic pressure. A small amount of transformer oil will flow from the opening 130 and the pressure within the chamber will subside and become balanced with the hydrostatic pressure of the seawater. As the valve stem 66 is moved from its outermost position to its innermost position the volume of displaced oil will decrease and sea water will then enter the pressure balancing unit 118 through the openings 130, and will communicate the hydrostatic pressure which is developed at the valve level into the yoke tube, drive unit and pressure balancing unit, through the transformer oil. Since the transformer oil is of a lower specific gravity than the specific gravity of sea water, and since the oil will not mix with sea water, the oil will float on the surface of the water and an oil and water separation level or liquid seal level 133 will be developed at the lower portion of the pressure balancing unit. At the innermost unextended position of the valve stem 66 a minimum displacement of transformer oil will occur and the liquid seal level will be at its uppermost level within the pressure balancing chamber 122 as illustrated at 133′ in broken lines in FIGURE 3. As the stem 66 moves to its outermost position (illustrated in dash lines in FIGURE 3) more fluid will be displaced from the chamber 122 by the valve stem 66 which will flow through the openings 130 into the sea and will cause the liquid seal level within the chamber 122 to be lowered to its minimum height (as illustrated in dash lines in FIGURE 3). The transformer oil, therefore, will effectively prevent sea water from entering the tube 120 where it would damage the stem control apparatus. The height of pressure balancing unit will effectively prevent sea water from entering the drive unit and yoke tube and will prevent any corrosion of the internal portions of the power operator and valve structure.

While discussion of this invention has generally been directed to the use of a pressure balancing system submerged in sea water, it should be obvious that the valve may be submerged in any liquid medium. The preservative liquid within the pressure balancing unit, however, must be of a lower specific gravity than the specific gravity of the surrounding medium and the two fluids must not tend to mix.

It will be evident, from the foregoing, that I have provided a novel pressure balancing and volume control apparatus for the power operator of a rising stem valve which effectively maintains a pressure balance internally and externally of the operator system at all times regardless of internal volume fluctuation or external pressure variation. The pressure balancing and volume control apparatus effectively prevents damage to the power operator system by leakage of fluid from the valve and permits servicing of the system while the same is in operation. Since the invention negates the use of a casing for enclosing the entire system as well as a pressurizing system for the casing, and since the structure is extremely simple, the cost for producing the system would accordingly be quite low relative to the cost of other valve protection systems. Therefore, it is seen that this invention is one well adapted to attain all of the objects hereinabove set forth, together with other advantages which are obvious and inherent from the description of the apparatus itself.

It will be understood that certain features and subcombinations are of utility and may be employed without reference to other features and subcombinations. This is contemplated by and is within the scope of the claims. As many possible embodiments may be made of the invention without departing from the spirit or the scope thereof, it is to be understood that all matters herein set forth or as shown in the accompanying drawings are to be interpreted as illustrative and not in a limiting sense.

I claim:
1. A valve for submerging in seawater and comprising a valve body forming a valve chamber and having flow passages communicating with the valve chamber, a valve member having a port formed therein and being movable between open and closed positions relative to the flow passages, a stem connected to the valve member and having a free end thereof extending outwardly of the valve body, said stem being movable axially to impart movement to the valve member, power operated means sur- rounding a portion of said stem and being operative to impart axial movement to the stem and valve member, a pressure balancing and volume controlling housing defining a chamber for surrounding the free end of the stem, said chamber having a liquid therein of lower specific gravity than seawater and which will not mix with seawater said chamber having at least one opening therein for allowing the flow of seawater alternately into and out of the chamber during operation of the power operated means, said liquid floating on said seawater in said chamber thereby establishing a fluid seal within the chamber for preventing the seawater from coming into contact with the internal portion of the power operated means, said liquid communicating the hydrostatic head of said seawater to said chamber thereby maintaining interior and exterior pressures of the power operated means in a balanced condition.

2. A valve for submerging in a corrosive medium and comprising a valve body forming a valve chamber and having flow passages communicating with the valve chamber, a valve member having a port formed therein and being movable between open and closed positions relative to the flow passages, a stem connected to the valve member and having a free end thereof extending outwardly of the valve body, said stem being movable axially to impart movement to the valve member, power operated means surrounding a portion of the stem and being operative to impart axial movement to the stem and valve member, a pressure balancing and volume controlling housing defining a chamber surrounding the free end of the stem, said chamber being in fluid communications with the power operated means and having at least one opening therein for allowing the flow of the corrosive medium alternately into and out of the chamber during operation of the power operated means, means forming a wall separating said opening from said stem end for preventing contact between the corrosive medium and the stem, fluid located within said power operated means and in said chamber, said fluid and chamber establishing a liquid seal within said chamber whereby the hydrostatic pressure of the corrosive medium is transmitted to the interior of the power operated means.

3. A power operator system for a valve to be submerged in a liquid medium, said valve having a valve stem extending outwardly therefrom, said system comprising a yoke tube fixed to the valve and surrounding a portion of the stem, a powered drive unit surrounding a portion of the stem and adapted to impart axial movement to the stem upon energization thereof, the interior of the drive unit communicating with the interior of the yoke tube, an enclosure for the outer extremity of the valve stem defining a pressure balancing chamber, said chamber being communicated with the interior of the drive unit, said yoke tube, drive unit and chamber being filled with a liquid substance of lower specific gravity than the specific gravity of said liquid medium, said chamber having at least one opening therein for communicating the interior of the chamber with the medium in which the system is submerged, means defining a wall within the chamber for separating the opening from the stem and for preventing contact between the stem and the liquid medium.

4. A power operator system for a valve to be submerged in water, said valve having a valve stem extending outwardly therefrom, said system comprising a yoke tube fixed to the valve and surrounding a portion of the stem, a powered drive unit surrounding a portion of the stem and adapted to impart axial movement to the stem upon energization thereof, the interior of the drive unit communicating with the interior of the yoke tube, an enclosure for the outer extremity of the valve stem defining a pressure balancing unit, said chamber being communicated with the interior of the drive unit, said yoke tube, drive unit and chamber being filled with oil, said chamber having at least one opening in the lower portion thereof for communicating the interior of the chamber with the medium in which the system is submerged, means forming a wall separating the opening from the stem and for preventing contact between the water and the stem.

5. A valve for submerging in a liquid medium comprising a valve body defining a valve chamber and having inlet and outlet passages in communication with the valve chamber, a valve member having a port formed therein being positioned for movement within the valve chamber between open and closed positions relative to the inlet and outlet passages, a stem having one extremity thereof fixed to the valve and extending through the valve body, a power operator surrounding a portion of the stem for imparting axial movement to the stem and valve member, means defining a chamber enclosing the other extremity of the stem, means communicating the liquid medium to the interior of the chamber, means defining a wall for preventing contact between the liquid medium and the stem, means within the chamber for forming a liquid seal with the liquid medium.

6. A power operator system for a valve to be submerged in a liquid medium, said valve having a valve stem extending outwardly therefrom, said system comprising a yoke tube fixed to the valve and surrounding a portion of the stem, a powered drive unit surrounding a portion of the stem and adapted to impart axial movement of the stem upon energization thereof, a housing having a closed top wall and a closed bottom wall positioned about the outer extermity of the stem, a support tube fixed to the bottom wall of the housing and extending into the housing to a position adjacent the top wall of the housing, at least a single opening formed in said bottom wall, a displaceable plug member fitted within the opening, a liquid of lower specific gravity than the specific gravity of the liquid medium substantially completely filling the chamber, the support tube, the operator and the yoke tube.

7. A power operator system for a valve to be submerged in a liquid medium, said valve having a valve stem extending outwardly therefrom, said system comprising a yoke tube fixed to the valve and surrounding a portion of the stem, a powered drive unit surrounding a portion of the stem and adapted to impart axial movement of the stem upon energization thereof, a housing defining a chamber and having close top, bottom and side walls, a tube extending into a side wall of the housing adjacent the top wall, the tube surrounding the outer extremity of the stem, at least a single aperture formed in the tube and opposing the top wall, at least one opening formed in the bottom wall of the chamber adapted for communication of the liquid medium with the chamber, a displaceable plug member closing the opening, a liquid of lower specific gravity than the specific gravity of the liquid medium substantially completely filling the chamber, the tube, the operator and the yoke tube.

References Cited

UNITED STATES PATENTS

| | | | |
|---|---|---|---|
| 1,777,115 | 9/1930 | Bruback | 251—267 X |
| 2,137,685 | 11/1938 | Gillen | 251—174 X |
| 2,731,168 | 1/1956 | Watts | 137—236 X |
| 2,747,774 | 5/1956 | Breitenback | 137—236 X |
| 2,970,646 | 2/1961 | Knapp | 166—45 |
| 3,212,516 | 10/1965 | Natho | 137—505 X |

WILLIAM F. O'DEA, *Primary Examiner.*

HAROLD WEAKLEY, *Assistant Examiner.*